Figure 1:
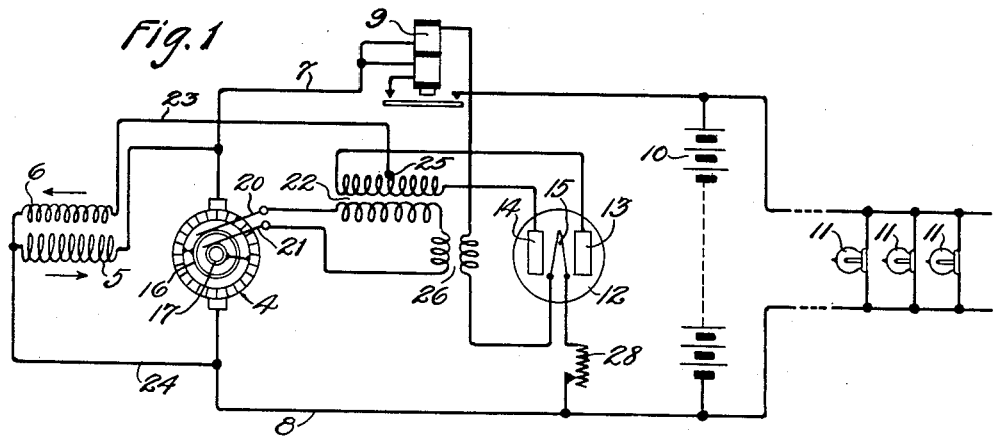

June 10, 1924.

H. M. STOLLER
ELECTRIC REGULATOR
Filed Feb. 15, 1922

1,497,309

Inventor:
Hugh M. Stoller
by J. G. Roberts
Att'y.

Patented June 10, 1924.

1,497,309

UNITED STATES PATENT OFFICE.

HUGH M. STOLLER, OF MOUNTAIN LAKES, NEW JERSEY, ASSIGNOR TO WESTERN ELECTRIC COMPANY, INCORPORATED, OF NEW YORK, N. Y., A CORPORATION OF NEW YORK.

ELECTRIC REGULATOR.

Application filed February 15, 1922. Serial No. 536,619.

*To all whom it may concern:*

Be it known that I, HUGH M. STOLLER, a citizen of the United States of America, residing at Mountain Lakes, in the county of Hanover, State of New Jersey, have invented certain new and useful Improvements in Electric Regulators, of which the following is a full, clear, concise, and exact description.

This invention relates to a novel type of regulator which is applicable in general for the regulation of electrical circuits, and is particularly adapted to be employed for regulating the electrical output, such as the voltage or current output of a generator employed in a train lighting system.

The usual train lighting system comprises a charging generator belted to the axle of the car, a storage battery feeding the lamp load, and switching means for disconnecting the generator from the battery when the rotating speed and consequently the voltage of the generator are inadequate for the charging. Whenever the battery is fully charged and the speed of the generator is above a certain minimum value, the battery floats and the lamp load is fed by the generator directly. Since it is essential that the generator should supply a substantially constant potential to the battery and the lamp circuit regardless of changes in the speed of the train, the regulating means of this invention has been provided.

The regulator provided according to the present invention is of the thermionic type and comprises a vacuum tube containing electrodes. As is well known in the art, the cathode of a vacuum tube serves as a source of electrons that travel to the anode or plate electrode, and the amount of this electron stream or space current depends upon several factors, primarily upon the voltage applied between these electrodes and also upon the temperature of the cathode, an increase in temperature producing a stronger space current. It is also well known that changes in the temperature of the cathode create much more than proportional changes in the space current of the tube so that a vacuum tube may be made to respond very readily to changes in the temperature of the cathode.

In accordance with this invention, the voltage of the generator of the train lighting system may be regulated by connecting the field winding thereof in circuit with the anode and cathode of the vacuum tube and by supplying the cathode with heating current which varies in response to the variations in the speed of the generator. The temperature of the cathode, and consequently the space current of the tube, will then respond to the changes in the voltage of the generator so that the variations in the space current may so modify the current in the field winding as to bring about the desired regulation.

In the preferred form of this invention the vacuum tube contains three electrodes, two of which are employed as anodes and one as a cathode. Space current for the tube is supplied by a transformer which has its primary winding connected to two slip rings mounted on the shaft of the generator, the slip rings being connected to two opposite commutator bars. The connections are such that the tube acts as its own rectifier and furnishes direct current to the differential winding of the generator which is in circuit with the anode and cathode of the tube. The cathode is connected between the output leads of the generator so that the temperature of the cathode is responsive to changes of voltage produced by changes in the speed of the generator.

It has also been found preferable to reduce the load of the generator at the higher speeds, thereby avoiding poor commutation at these speeds by causing the regulator to reduce slightly the generated voltage when the speed of the generator begins to exceed a certain value. This reduction of the generated voltage serves to decrease more than a proportional amount the battery charging current, thereby producing the reduction in load desired. One way this reduction of the generated voltage at high speeds may be accomplished is to provide an additional source of heating current for the filament which source will be responsive to the speed of the generator and will also, while being effective for high speeds, be relatively ineffective at lower speeds. This additional source of heating current for the cathode may comprise a small transformer, the primary of which is connected in circuit with the slip rings above mentioned.

This application is a continuation in part of my earlier filed application, Serial No. 339,589 filed November 21, 1919. All of the subject matter in said prior application is incorporated in this application together with certain additional subject matter.

Figure 2:
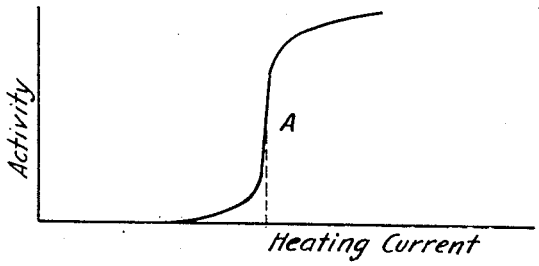
Figure 3:
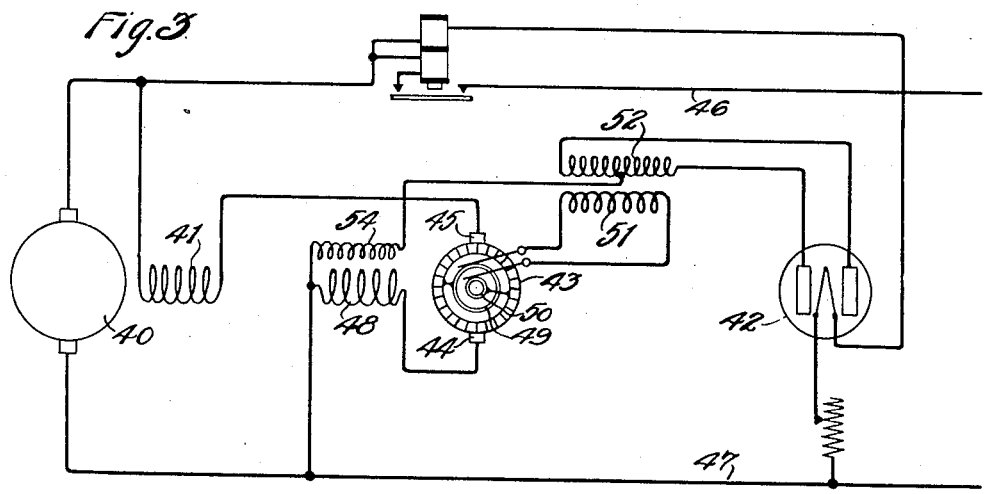

This invention will be better undersood by reference to the following detailed description taken in connection with the accompanying drawings, in which Fig. 1 represents an embodiment of this invention in a train lighting system; Fig. 2 is a curve which illustrates the variation in the thermionic activity of a filament with respect to changes in its heating current; and Fig. 3 is a modification of the regulating system of Fig. 1.

The train lighting system shown in Fig. 1 comprises a direct current generator 4 having a main field winding 5 and a differential field winding 6. The output leads 7 and 8 of the generator are connected through the cutout switch 9 to a battery 10 to be charged thereby and to a load consisting of a plurality of lamps 11. Cutout switch 9 serves the same purpose as in standard train lighting systems to connect the generator 4 to the battery and to the load when the speed of the generator is above a certain value and disconnect the generator when the speed is below that value. In general it will be found preferable to have the switch 9 designed to cut in the generator when the speed of the train is in the neighborhood of 15 miles per hour. After the generator has been connected to the battery and the lamp load for a time sufficient to charge the battery 10, the battery 10 will float and the lamp load will be supplied with current directly from the generator 4.

In order to maintain sufficiently constant the voltage of generator 4, the vacuum tube regulator 12 is provided which contains two anodes 13 and 14 and a filament or cathode 15. Filament 15 is connected across leads 7 and 8 so that heating current for the filament is supplied directly from the generator. In order to provide a source of high voltage for supplying space current to tube 12, two slip rings 16 and 17, which are mounted on the shaft of the generator, are connected to two opposite commutator bars 18 and 19. Leads are provided from brushes 20 and 21 to the primary winding of step-up transformer 22, the secondary of which is connected between anodes 13, 14 and cathode 15 by the following path: From cathode 15, through leads 8 and 24, differential winding 6, lead 23, through one half of the secondary of transformer 22 to anode 13 and through the other half of the secondary to anode 14. The current in the opposing winding 6, therefore, depends upon the value of space current in tube 12. Since current will flow through tube 12 only between the cathode and that anode which is positive with respect to the cathode, it follows for one-half of each cycle of the single phase alternating current induced in the secondary of transformer 22, that current will flow between one anode and the cathode, while for the other half of each cycle current will flow between the other anode and the cathode. Tap 25 should be at the midpoint of the secondary of the transformer 22 in order to insure that the two half cycles passing through the tube will be of equal intensity.

The method by means of which the vacuum tube regulator serves to hold substantially constant the output of generator 4 may now be explained as follows:

As is well known in the art the thermionic activity of a cathode varies with the heating current supplied thereto in a manner similar to the curves shown in Fig. 2, where the abscissæ represent various values of the cathode heating current and the ordinates represent the corresponding thermionic activity of the cathode. Filament 15 of tube 12 should be so chosen that when the speed of the generator is just sufficient to supply normal voltage, the heating current should be such as to give the thermionic activity of the filament a value corresponding to the midpoint of the slope of the characteristic curve such as indicated at A. When the speed of the generator increases beyond the speed necessary to supply normal voltage, the voltage will tend to increase likewise. Any increase of voltage output in generator will, however, increase the temperature of the cathode which will cause more current to flow between the anodes and the filament and consequently through the differential winding 6. Since a small increase in the temperature of the filament 15 will produce a much more than proportional increase in the space current of the tube, it follows that the increase in the current through differential winding 6 will restrict the rise in the generated voltage to a small value, thereby holding the voltage substantially constant regardless of increase of speed. Any change in the speed of the generator will, therefore, so change the temperature of the cathode and the current through the differential winding 6, that the tendency of the voltage to change with the speed will be substantially eliminated. Thus, with a variation in speed of over 400% it has been found possible to control the generated voltage in the above manner so that the voltage never varies more than two per cent away from the desired value.

In order to reduce the load on the generator at high speeds and thereby insure good commutation at the high speeds, it may be found necessary to supply heating current to the filament from an additional source which, while being effective at high speeds such as 50 to 75 miles per hour, is substantially ineffective at lower speeds. Transformer 26 provides such a source since the alternating current voltage impressed thereby on the filament circuit will be proportional to the current in its primary winding, which will be greater at higher speeds due to the greater current drawn by the secondary of transformer 25 and the differential field 6 from the regulator tube. As the alternating current component of the filament heating current increases, the direct current component required to maintain the necessary temperature will be less. This will result in a slight reduction in the normal value of the generated voltage and a much larger reduction in the battery charging current, thereby decreasing the ratio of the armature ampere turns to the field ampere turns and insure good commutation without sparking.

It is to be noted that the voltage coil of the cutout switch 9 is in series with the filament 15. This insures that the cutout switch will be deenergized to disconnect the generator from the lamps and battery if the filament 15 should happen to burn out, or be otherwise broken.

The chief advantage in obtaining the plate voltage of the tube 12 from the transformer supplied with alternating current, as shown in the drawing, is that such an arrangement enables a higher impedance regulator tube requiring a higher anode-cathode voltage to be employed than would otherwise be possible in a train lighting system where the direct current voltage desired from the generator is in the neighborhood of only 30 volts.

A convenient method of adjusting the constant voltage generated by generator 4 is obtained by inserting an adjustable resistance 28 in series with cathode 15. Since the temperature of cathode 15 will depend upon the effective value of resistance 28, it follows that an increase of the value of resistance 28 will increase the value of constant voltage generated by generator 4, while a decrease of the value of this resistance will decrease the normal value of this voltage.

The generator 4 shown in Fig. 1 is provided with both a main field winding and a differential field winding and also has the special feature of slip rings 20 and 21 mounted on its shaft from which the high anode-cathode voltage is obtained. In case it is inconvenient or undesirable to employ a generator having these special features for train lighting systems or other similar uses, it may be found desirable to employ the regulating system shown in Fig. 3, in which the generator 40 is of the type now ordinarily employed in train lighting systems and has only one field winding 41, no slip ring being provided. In this figure, the high voltage for the anodes and cathodes of the regulator tube 42 is obtained by means of a small auxiliary motor 43. The terminals 44 and 45 of motor 43 are connected across the supply leads 46 and 47 of generator 40 through a circuit containing in series, field winding 41 of generator 40 and main field winding 48 of the motor 43. Mounted on the shaft of the motor 43 are slip rings 49 and 50 from the associated brushes of which leads are taken to the primary winding 51 of a transformer similar to transformer 22 of Fig. 1. The outside terminals of the secondary winding 52 of this transformer are connected to the two anodes of the regulator tube 42 while the midpoint of the secondary winding is connected through the auxiliary aiding winding 54 of motor 43 to the supply lead 47. It is therefore evident that the alternating current developed in the primary winding 51 will supply the necessary high voltage between the anodes and the cathodes of the regulator tube 42 in the same manner as transformer 22 of Fig. 1, described in detail above. It is also apparent that the space current for regulator tube 42 flows through the auxiliary aiding winding 54 of motor 43 so that the speed of the motor is directly dependent upon the intensity of the space current in the regulator tube 42. The cathode electrode of the regulator tube is connected across the supply leads 46 and 47 and is therefore responsive to changes in the voltage of the generator 40. If, for example, the voltage of generator 40 tends to increase, the space current of tube 42 will increase a much greater amount, thereby increasing the current flowing through aiding winding 54 of motor 43. This will increase the excitation of the motor 43 thereby increasing the back E. M. F. developed by the motor so as to cut down the current flowing through the field winding 41 of generator 40 an amount sufficient to secure the desired regulation. If the voltage in generator 40 tends to decrease, for example, the regulating tube 42 will cause the current to decrease in aiding winding 54 thereby decreasing the excitation of the motor and decreasing the effective resistance afforded by the motor to the field winding current for generator 40.

As stated above, one advantage derived from the system in Fig. 3, is that generators of the ordinary type may be regulated thereby without any modification whatsoever, such as requiring two field windings or requiring slip rings to be mounted on the shaft of the generator. The auxiliary motor 43 need not be very large to produce the desired result for train lighting systems and probably will not need to be more than one-tenth of a H. P. motor or even less. If desired, generator 40 may be employed to light lamps and charge a storage battery as in Fig. 1.

In case the generator 40 is small no special means will, in general, be necessary to keep motor 43 from running at an excessive speed, since the friction of the brushes of the motor will keep the motor running at a safe speed. But when generator 40 is large so that there is considerable power in its field winding circuit, some load should be put on the motor 43. It may be made to run a fan for example.

As described above, the flux of winding 54 should be aiding to that of winding 48 in order for an increase in current through winding 54 to increase the excitation of the motor and its back E. M. F.

It is to be understood that the embodiments of this invention described above may be variously modified without departing from the scope of this invention. For example other means well known in the art may be employed to obtain alternating current from motor 43.

In my copending application Serial No. 244,636, filed July 12, 1918, for electric regulators, I have disclosed and claimed broadly an arrangement comprising a thermionic device for producing regulation of the general character disclosed in the present application and the claims in the present application have been limited to features not disclosed in my said earlier application.

What is claimed is:

1. The combination of an electrical machine and a regulator associated therewith, said regulator comprising a vacuum tube having an anode and a cathode, means for supplying to said cathode direct current the intensity of which depends upon a characteristic of said machine and means for supplying to said cathode alternating current the intensity of which depends upon a characteristic of said machine.

2. The combination of an electric machine having an exciting winding, a regulator associated therewith, said regulator comprising a vacuum tube having an anode and a cathode in circuit with said winding, said cathode being connected to the terminals of said machine and connections for supplying to said cathode alternating current the intensity of which depends upon a characteristic of said machine.

3. In combination, an electric machine having an exciting winding, a regulator associated therewith, said regulator comprising a vacuum tube having an anode and a cathode in circuit with said winding, means for supplying to said cathode direct current the intensity of which depends upon a characteristic of said machine and an additional means for supplying to said cathode heating current responsive to a characteristic of said machine, said additional means being more effective at higher speeds of said machine that at lower speeds.

4. In combination, an electric machine and a regulator associated therewith, said regulator comprising a vacuum tube having an anode and a cathode and means responsive to a characteristic of said machine for supplying heating current to said cathode, said means at relatively low speeds supplying substantially a direct current component only, said means at higher speeds supplying a direct current component and an appreciable alternating current component.

5. In combination, an electric generator, regulating means for keeping substantially constant a characteristic of said generator, said means comprising a vacuum tube associated with said generator and having an anode and a cathode, means for controlling said characteristic through the intermediary of variations in the temperature of said cathode, said means being responsive to the speed of said generator for decreasing the output current of said generator for high speeds.

6. In combination, an electric machine and a regulator therefor, said regulator comprising a vacuum tube associated therewith having a plurality of electrodes, means for supplying space current to said tube, means for varying said space current in accordance with variations in a characteristic of said machine, connections for controlling said machine through the intermediary of said variations in space current and means acting on said regulator for reducing the load on said machine at high speeds.

7. In combination, an electric machine and a regulator therefor, said regulator comprising a vacuum tube associated therewith and having a plurality of electrodes, means for supplying space current to said tube, means for varying said space current in accordance with variations in a characteristic of said machine, means for controlling said machine through the intermediary of said variations in space current and means for supplying variable alternating current for heating one of said electrodes.

8. In combination, an electric machine and a regulator therefor, said regulator comprising a vacuum tube associated therewith, and having a plurality of electrodes, means for supplying space current to said tube. means for varying said space current in accordance with variations in a characteristic of said machine, connections for controlling said machine through the intermediary of said variations in space current and means for supplying to one of said electrodes a variable alternating current potential.

9. In combination, an electric machine and a regulator therefor, said regulator comprising a vacuum tube associated therewith and having a plurality of electrodes, means for supplying space current to said tube, means for supplying to one of said electrodes heating current which varies in intensity in accordance with a characteristic of said machine and means for supplying to one of said electrodes an alternating current which varies in intensity in accordance with a characteristic of said machine.

10. The combination of an electric machine and a regulator therefor, said regulator comprising a vacuum tube having a plurality of electrodes in circuit with said machine and means for supplying alternating current for supplying space current to said tube and for heating one of said electrodes.

11. The combination of an electric machine and a regulator therefor, said regulator comprising a vacuum tube having a plurality of electrodes in circuit with said machine, connections for drawing from said machine an alternating current potential for supplying space current to said tube and for supplying heating current to one of said electrodes.

12. In combination, an electric machine, a vacuum tube regulator therefor having a plurality of electrodes, connections for controlling the heating of one of said electrodes in response to variations in a characteristic of said machine, and means for supplying between said electrodes an alternating current potential derived from said machine, said tube being adapted to utilize both halves of each alternating current wave.

13. In combination, an electric machine, a vacuum tube regulator therefor having a plurality of electrodes, said machine having a main field winding and an auxiliary field winding, connections between said auxiliary field winding and the electrodes of said tube whereby the current in said auxiliary winding is dependent upon the space current between said electrodes, connections for controlling the space current of said tube in response to variations in a characteristic of said machine, and means for supplying between said electrodes an alternating current potential derived from said machine, said tube being adapted to utilize both halves of the alternating current wave.

14. In combination, an electric machine, a vacuum tube regulator therefor comprising a cathode and a plurality of anodes, a transformer, means for supplying to the primary of said transformer alternating current waves derived from said machine, connections between the secondary winding of said transformer and said cathode and said anodes, whereby both halves of each alternating current wave produce space current in said tube, connections between said machine and said cathode for supplying to said cathode heating current varying in response to variations in a characteristic of said machine, and an exciting winding for said machine responsive to changes in the space current of said tube.

15. In combination, an electric machine, a regulator therefor comprising a vacuum tube associated with said machine and having a plurality of electrodes, a load circuit for said machine and a solenoid for controlling a connection of said machine to said load in response to a characteristic of said machine, said solenoid being in circuit with one of said electrodes.

16. In combination, an electric machine, a regulator therefor, comprising a vacuum tube associated with said machine and having an anode and a filamentary cathode, a load circuit for said machine and a solenoid for controlling the connection of said machine to said load, said solenoid being in circuit with said filament.

17. In combination, an electric machine, a regulator therefor, comprising a vacuum tube associated with said machine and having an anode and a cathode, a load circuit for said machine and a solenoid for controlling the connections of said machine to said load circuit, connections for supplying heating current to said cathode varying in accordance with variations in a characteristic of said machine, said solenoid being in circuit with said connections.

18. An electric machine, a battery to be charged thereby, a thermionic device having electrodes, connections from said machine for supplying direct current charging current to said battery, connections from said machine for supplying alternating current potential to the electrodes of said device, said device being responsive to variations in a characteristic of said machine for reducing said variations to a low value.

19. In combination, an electric machine, a load circuit adapted to be connected to said machine, a vacuum tube regulator having electrodes for holding substantially constant a characteristic of said machine, connections for supplying current from said machine to said tube, and a solenoid in circuit with said connections for controlling the connections of said machine to said load circuit.

20. In combination, a generator having an exciting winding, a battery to be charged thereby, a solenoid for controlling the connection of said generator to said battery, means for regulating the voltage of said generator, said means comprising a vacuum tube having an anode and a cathode, means for supplying a variable space current to said tube, connections whereby the current through said exciting winding is responsive to a condition of said tube, said solenoid having an energizing circuit completed through the intermediary of an electrode of said tube.

21. In combination, an electric machine, a regulator therefor comprising a vacuum tube associated with said machine and having a cathode and a plurality of anodes, means for causing said machine to generate alternating current potential, a transformer, connections for supplying to the primary of said tranformer said alternating current, the secondary of said transformer being connected between said anodes and a connection between an intermediate point of said secondary and said cathode.

22. In combination, an electric machine having an exciting winding, a regulator therefor comprising a vacuum tube associated with said machine and having a cathode and a plurality of anodes, a transformer having a primary and a secondary winding, connections for supplying to said primary winding alternating current, derived from said machine, said secondary winding being connected in circuit with said anodes and a connection between an intermediate point of said secondary winding through said exciting winding to said cathode.

23. In combination, an electric machine having a main field winding and a differential field winding, a vacuum tube associated with said machine, said tube having a cathode and a plurality of anodes, a transformer, connections for supplying to the primary of said transformer alternating current, derived from said machine, said secondary being connected between said anodes, said cathode being connected across the terminals of said machine and a connection between an intermediate point on said secondary winding through said differential field winding to said cathode.

24. In combination, an electric machine, a vacuum tube responsive to a condition of said machine, said vacuum tube having an anode and a cathode, means for deriving from said machine an alternating current potential, a transformer having one winding connected to said means and another winding connected between said anode and said cathode and a second transformer having its primary winding connected to said machine and its secondary winding in circuit with said cathode.

25. The combination with a direct current generator of a regulator for holding substantially constant the voltage of said generator, said regulator comprising a vacuum tube having an anode and a cathode, a transformer, slip rings mounted on the shaft of said generator for supplying to the primary winding of said transformer an alternating current potential, the secondary of said transformer being connected between said anode and said cathode and connections whereby said generator is responsive to the intensity of the space current between said anode and said cathode.

26. In combination, a direct current generator having a main field winding and a differential field winding, a regulator responsive to the speed of said generator for holding substantially constant the voltage of said generator, said regulator comprising a vacuum tube having an anode and a cathode, a battery to be charged by said generator, a solenoid for controlling the connection of said generator to said battery, means for supplying space current to said tube from said generator, said differential winding being connected in circuit with the space current path between said anode and cathode, connections for supplying to said cathode heating current which varies in response to changes in the speed of said generator, said solenoid being in circuit with said cathode.

27. In an electric system, a vacuum tube having a plurality of electrodes, and means for simultaneously heating one of said electrodes comprising a source of direct current and a source of alternating current.

28. In an electric system, a vacuum tube having an anode and a filamentary cathode, means for supplying direct current for heating said cathode, and means for supplying alternating current for heating said cathode, said means acting simultaneously.

29. In combination, a direct current generator, a load circuit for said generator, said generator being adapted to supply a definite voltage to said load circuit, a vacuum tube responsive to variations in a characteristic of said generator for holding substantially constant the voltage delivered to said load circuit, said tube having spaced electrodes between which space current is adapted to pass, said tube being of such a character that a higher voltage than the voltage of said work circuit is required to produce the desired space current in said tube, and connections between said generator and said tube for supplying to said electrodes a higher voltage than that supplied to said load circuit.

30. In combination, a direct current generator, a vacuum tube responsive to changes in a characteristic of said generator for regulating a characteristic of said generator, said tube comprising an anode and a cathode, slip rings mounted on the shaft of said generator, and connections from said slip rings for supplying heating current to said cathode.

31. In combination, an electric machine having an exciting winding, a vacuum tube having an anode and a cathode between which space current is adapted to pass, slip rings mounted on the shaft of said machine, connections from said slip rings for supplying heating current to said cathode, and connections for varying the current in said winding when variations occur in the space current of said tube.

32. A regulating system for an electric circuit comprising a dynamo electric machine adapted to regulate by variations in its excitation a condition of said circuit, a vacuum tube having a cathode arranged to be supplied with a heating current that varies with variations in the condition of the circuit being regulated and an anode, means for impressing across the anode and cathode an alternating current voltage derived from said machine, said voltage being higher than the voltage of said circuit, and a field winding for said machine connected in series with said anode and cathode.

33. A regulating system for an electric circuit comprising a dynamo electric machine adapted to regulate by variations in its excitation a condition of said circuit, a vacuum tube having a cathode arranged to be supplied with a heating current that varies with variations in the condition of the circuit being regulated and an anode, means for impressing across the anode and cathode an alternating current voltage, said tube being adapted to utilize both halves of each alternating current wave, and a field winding for said machine connected in series with said anode and cathode.

34. A regulating system for an electric circuit comprising a dynamo electric machine adapted to regulate by variations in its excitation a condition of said circuit, a vacuum tube having a plurality of anodes and a cathode arranged to be supplied with a heating current that varies with variations in the condition being regulated, a transformer, means for impressing a periodic current upon the primary winding of said transformer, connections between the secondary winding of said transformer and said cathode and said anodes whereby both halves of each alternating current wave produced in the secondary winding causes space current to flow through said tube, and a field winding for said machine responsive to changes in the space current of said tube.

35. A regulating system for an electric circuit comprising a direct current generator adapted to regulate by variations in its excitation a condition of said circuit, a vacuum tube having a cathode arranged to be supplied with heating current that varies with variations in the condition being regulated and an anode, means controlled by said generator for impressing an alternating current voltage across said anode and cathode greater in magnitude than the direct current voltage impressed on said circuit by said generator, and means responsive to the space current of said tube for varying the excitation of said generator.

In witness whereof, I hereunto subscribe my name this 14th day of February A. D., 1922.

HUGH M. STOLLER.